United States Patent
Aditham et al.

(10) Patent No.: US 6,192,419 B1
(45) Date of Patent: Feb. 20, 2001

(54) COLLABORATIVE FRAMEWORK FOR DISPARATE APPLICATION PROGRAMS

(75) Inventors: Radhakrishna Aditham, Cupertino; Rajiv Jain, San Jose; Muralidharan Srinivasan, Sunnyvale, all of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 08/878,194

(22) Filed: Jun. 18, 1997

(51) Int. Cl.[7] .................................................. G06F 15/16
(52) U.S. Cl. ............................................ 709/315; 709/205
(58) Field of Search ..................................... 395/682, 683, 395/200.35, 200.43; 709/313, 315, 205

(56) References Cited

U.S. PATENT DOCUMENTS

| | | | |
|---|---|---|---|
| 4,688,170 | * | 8/1987 | Waite et al. ........................... 364/200 |
| 5,146,593 | * | 9/1992 | Brandle et al. ....................... 395/700 |
| 5,187,787 | * | 2/1993 | Skeen et al. .......................... 395/600 |
| 5,218,699 | * | 6/1993 | Brandle et al. ....................... 395/650 |
| 5,247,615 | | 9/1993 | Mori et al. . |
| 5,280,583 | | 1/1994 | Nakayama et al. . |
| 5,390,328 | | 2/1995 | Frey et al. . |
| 5,392,400 | * | 2/1995 | Berkowitz et al. ................... 395/200 |
| 5,446,842 | | 8/1995 | Scheffer et al. . |
| 5,481,721 | * | 1/1996 | Serlet et al. .......................... 395/700 |
| 5,546,584 | * | 8/1996 | Lundin et al. ........................ 395/700 |
| 5,590,281 | * | 12/1996 | Stevens ........................... 395/200.01 |
| 5,619,710 | * | 4/1997 | Travis, Jr. et al. ................... 395/800 |
| 5,706,349 | | 1/1998 | Aditham et al. . |
| 5,729,671 | | 3/1998 | Peterson et al. . |
| 5,732,271 | | 3/1998 | Berry et al. . |
| 5,748,894 | * | 5/1998 | Ishizaki et al. .................. 395/200.04 |
| 5,781,732 | * | 7/1998 | Adams ............................ 395/200.35 |
| 5,812,773 | | 10/1998 | Norin . |
| 5,812,794 | | 9/1998 | Heidel et al. . |
| 5,822,585 | * | 10/1998 | Noble et al. .......................... 395/680 |

OTHER PUBLICATIONS

Miller, "Troubleshooting TCP/IP: Analyzing the Protocols of the Internet", M & T Books, pp. 368–370, Jan. 1993.*
Yellin et al., Interfaces, Protocols, and the Semi–Automatic Construction of Software Adaptors, OOPSLA Compendium 1994, 176–190, Oct. 1994.*
Martin, "Design and Strategy for Distributed Data Processing," Prentice Hall, Inc., pp. 272–305, Dec. 1981.*
Notkin et al., "Interconnecting Heterogeneous Computer Systems," ACM, pp. 258–273, Mar. 1988.*

* cited by examiner

Primary Examiner—Zarni Maung
Assistant Examiner—Gary Scott Fourson
(74) Attorney, Agent, or Firm—Kudirka & Jobse, LLP (57) ABSTRACT

A collaborative application framework is used to build application programs which communicate with a central collaboration manager by means of a predetermined protocol. The predetermined protocol allows converters to be located at the collaboration manager site so that the programs neither include, nor require, preconfigured converters. Accordingly, new programs may easily and inexpensively be added to the system. The framework includes class code information which is incorporated into each application program by subclassing and which allows the program to communicate with the central manager by passing messages. The framework further includes class code for creating in the central manager a session object which receives a first message from a first program, converts the information in the first message into an information format utilized by a second program and forward a second messages to the second program containing information in the appropriate format. Since the converting mechanism is a part of a session object, it is not incorporated into first and second programs.

16 Claims, 9 Drawing Sheets

COLLABORATIVE FRAMEWORK FOR DISPARATE APPLICATION PROGRAMS

RELATED APPLICATIONS

This application contains subject matter which is related to subject matter disclosed in U.S. patent applications entitled: Internet-Based Collaborative Framework Ser. No. (08/878,442) and Collaborative Framework Having Shared Objects, Ser. No. (08,878,193) all filed by Radhakrishna Aditham, Rajiv Jain, and Muralidharan Srinivasan, on an even date herewith and assigned to the present assignee.

FIELD OF THE INVENTION

This invention relates generally to collaborative application programs and, more particularly, to a collaborative framework that facilitates development of application programs which can share data with arbitrary formats.

BACKGROUND OF THE INVENTION

A collaborative manager is a program that facilitates communication between multiple application programs ("programs") stored on one or more computers. The programs may reside in computers that are remote from each other and differ in hardware construction and operating system software. The computers can be connected via a network, such as the Internet or a local area network. Consequently, these programs, which may have radically different input and output requirements, must share information through the manager to accomplish a specified task. The manager also coordinates activities of the collaborating programs. For example, a stock market trading program, running on a particular computer platform, may collaborate with a database program, running on a different computer platform, to obtain and then store the name and value of a stock on a selected day. After locating the stock name and daily value via a network (e.g., the Internet), the stock market trading program generates an output with the latter information and transmits the output to the collaboration manager. The manager then broadcasts the information to all computers having programs which are collaborating by means of the manager. These computers may be terminals that are remote from a server on which the manager runs. Once the output from the manager is received by the database program, it is converted into a form which is usable with the database program, and then stored in a database. The manager in this example therefore provides the mechanism for receiving output from a stock market trading program in one format, and directing that output to the database program.

Programs utilized with such collaborative systems must be configured so that each program can recognize and process the output from the other programs. Specifically, each program must be preconfigured with a converter that converts output from any of the other programs into an input which the program can use. In the above example, the database program must include a converter that can accept output data from the stock market trading program in a particular configuration and change that configuration so that it corresponds with the data already stored in the database.

Problems arise, however, when a new program is added to the system after the converter in the existing programs are initially configured. In particular, the system and the existing programs typically will malfunction (i.e., crash) because none of the existing programs includes a converter with a knowledge of the output of such new program. Continuing with the above example, the addition of a new program that determines the stock name and the closing price of the stock for the preceding five days can cause the database program to crash since the database program has the capability of converting the stock name and daily price only. Absent a converter with a knowledge of the new program output, the database program cannot convert and utilize the new output. This problem may be solved by reconfiguring the converters for each program to recognize output from the new program. Reconfiguring the converters, however, typically is not a trivial task. It can be time consuming, inconvenient, and costly, especially when there is a large number of programs utilizing the collaborative system.

Accordingly, it would be desirable to have a collaborative system that facilitates the addition of new programs to the system without requiring that each of the existing programs be reconfigured. It also would be desirable to have a system that does not require a converter in each of the programs.

SUMMARY OF THE INVENTION

In accordance with one aspect of the invention, a collaborative application framework is used to build application programs which communicate with a central collaboration manager by means of a predetermined protocol. The predetermined protocol allows converters to be located at the collaboration manager site so that the programs neither include, nor require, preconfigured converters. Accordingly, new programs may easily and inexpensively be added to the system.

The framework includes class code information which is incorporated into each application program by subclassing and which allows the program to communicate with the central manager by passing messages. The framework further includes class code for creating in the central manager a session object which receives a first message from a first program, converts the information in the first message into an information format utilized by a second program and forward a second messages to the second program containing information in the appropriate format. Since the converting mechanism is a part of a session object, it is not incorporated into first and second programs.

In accordance with another aspect of the invention, a third message from the first program with information in a third format may be directed to the session object. The session object converts the third information into information with the second format and sends the third information to the second program via a fourth message.

In accordance with another aspect of the invention, each remote computer includes a single agent for directing messages between each program running on the computer and a session object. The agent incorporates a mailbox which receives and holds messages passing between the program and the session object.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF ILLUSTRATIVE EMBODIMENTS

Figure 1:
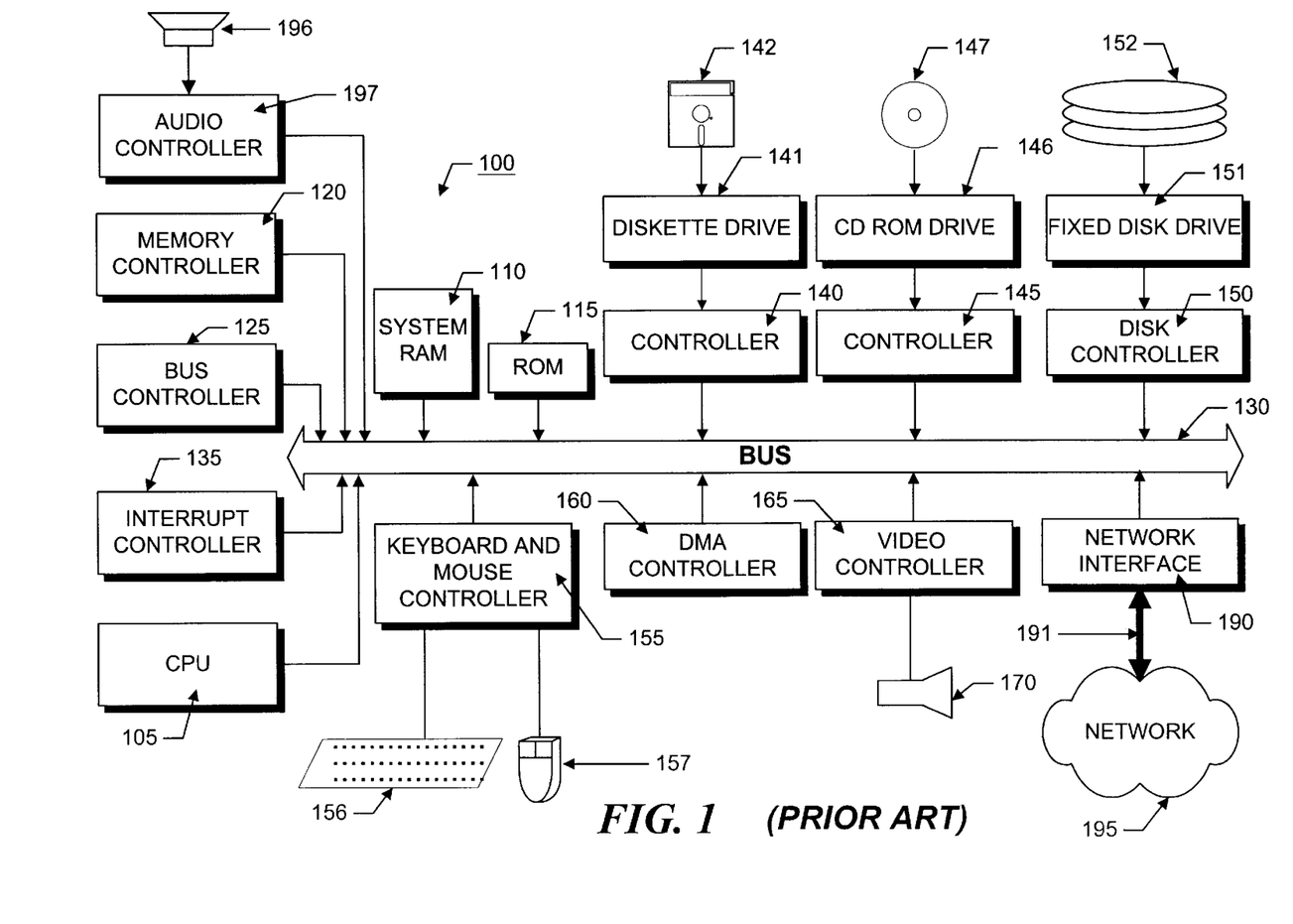
FIG. 1 is a schematic illustration of a prior art computer architecture on which the application programs built with the inventive collaborative framework may be implemented.

FIG. 1 illustrates the system architecture for an exemplary computer system 100, such as an IBM THINKPAD 701@ computer, on which the applications constructed with the inventive collaboration framework can be implemented. The exemplary computer system of FIG. 1 is discussed only for descriptive purposes, however, and should not be considered a limitation of the invention. Although the description below may refer to terms commonly used in describing particular computer systems, such as an IBM THINKPAD 701@ computer, the described concepts apply equally to other computer systems, including systems having architectures that are dissimilar to that shown in FIG. 1.

The computer 100 includes a central processing unit (CPU) 105, which may include a conventional microprocessor, random access memory (RAM) 170 for temporary storage of information, and read only memory (ROM) 115 for permanent 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to computer 100 through bus 130 and an appropriate controller. DMA controller 160 is provided for performing direct memory access to system RAM 110. A visual display is generated by a video controller 165, which controls video display 170.

Computer system 100 generally is controlled and coordinated by operating system software, such as the WINDOWS 95@ operating system (available from Microsoft Corp., Redmond, Wash.). Among other computer system control functions, the operating system controls allocation of system resources and performs tasks such as process scheduling, memory management, networking and I/O services.

Computer 100 also includes a network adapter 190 that allows the computer 100 to be interconnected to a network 195 via a bus 191. The network 195 may be a local area network (LAN), a wide area network (WAN), or the Internet.

Figure 2:
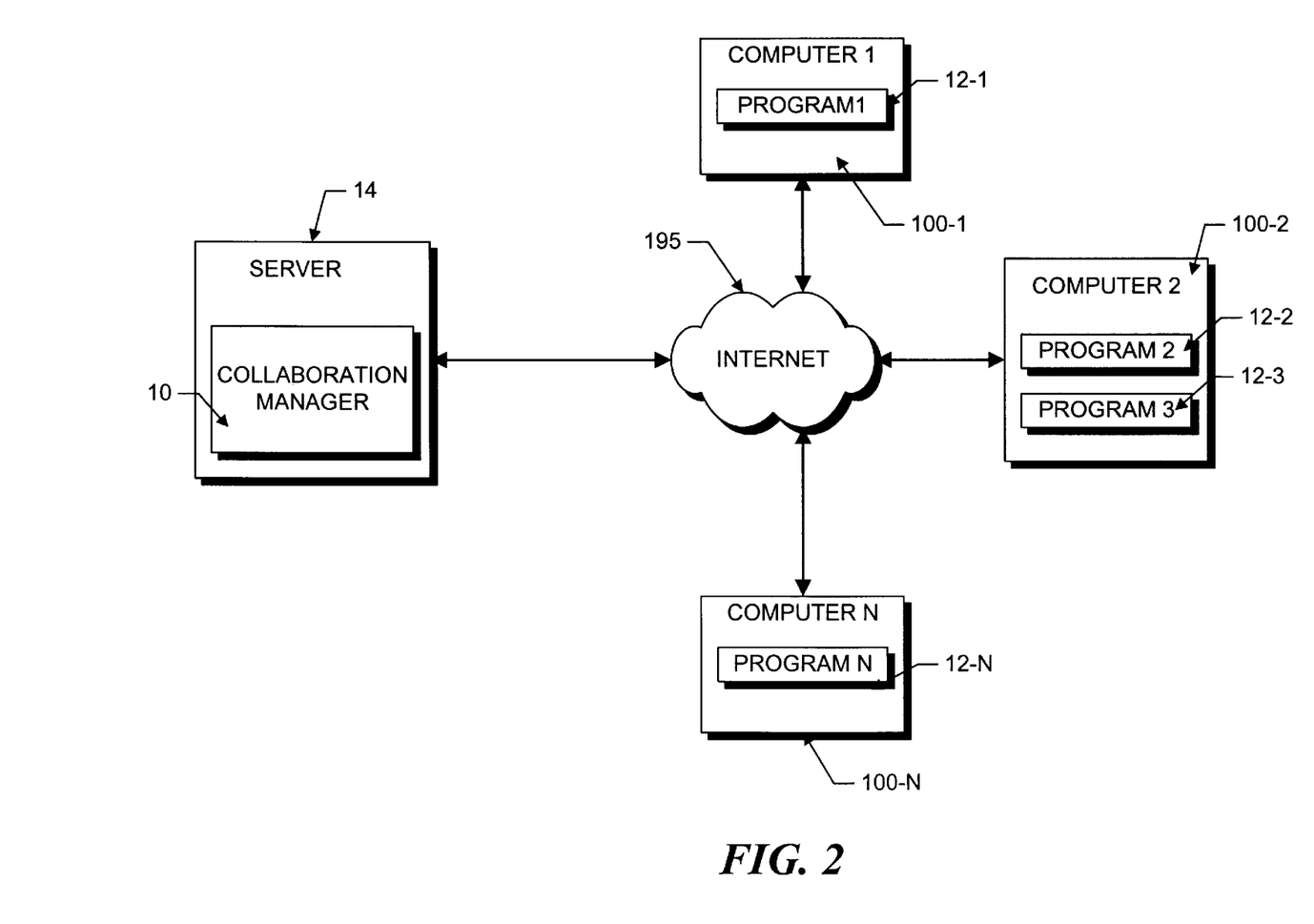
FIG. 2 is a schematic illustration of an exemplary network configuration that may be utilized for implementing a collaborative system in accordance with the principles of the invention.

FIG. 2 shows an exemplary network configuration for implementing a collaboration system utilizing the inventive application framework. The network includes a server 14 on which a collaboration manager 10 is located, and a plurality of computers, 100-1 to 100-N, that each include programs, 12-1 to 12-N, for use with the manager 10. Each computer may have a single collaborating program running on it, for example, as illustrated in the case of computers 100-1 and 100-N which have programs 12-1 and 12-N executing thereon, respectively. Alternatively, more than one collaborating program may be running on the same computer as illustrated in computer 100-2. Each of the application programs, 12-1 to 12-N, preferably are stand-alone programs that can function independently of the manager 10, but can collaborate when operating with manager 10.

In accordance with a preferred embodiment of the invention, a collaboration manager 10 is built from the inventive collaboration framework so that it acts as an interface between two or more application programs having disparate information formats (e.g., protocols, syntax, etc . . . ). The programs 12-1 to 12-N are also built using the inventive collaboration framework so that they collaborate (i.e., share information) by transmitting informational messages having a predetermined format to the manager 10 via a network, such as the Internet 195.

In accordance with a preferred embodiment of the invention, the programs 12-1 to 12-N do not necessarily utilize the same internal information formats for managing data. For example, program 12-1 and program 12-2 may communicate by means of manager 10 even though they use different internal data formats and are running on different computer platforms 100-1 and 100-2. For the two programs 12-1 and 12-2 to communicate in this manner, the first program output must converted into an format that is compatible with the input format of the second program. Accordingly, the manager 10 includes a converter for performing such a conversion. This converter will be compatible with programs 12-1 and 12-2 because each program has been built with objects subclassed from classes in the inventive framework. Therefore, the system does not require separate converters in each of programs 12-1 and 12-N because the the converter is included with a standard interface in the collaboration manager 10. The details of such a converter are discussed below with reference to FIG. 8.

Figure 3:
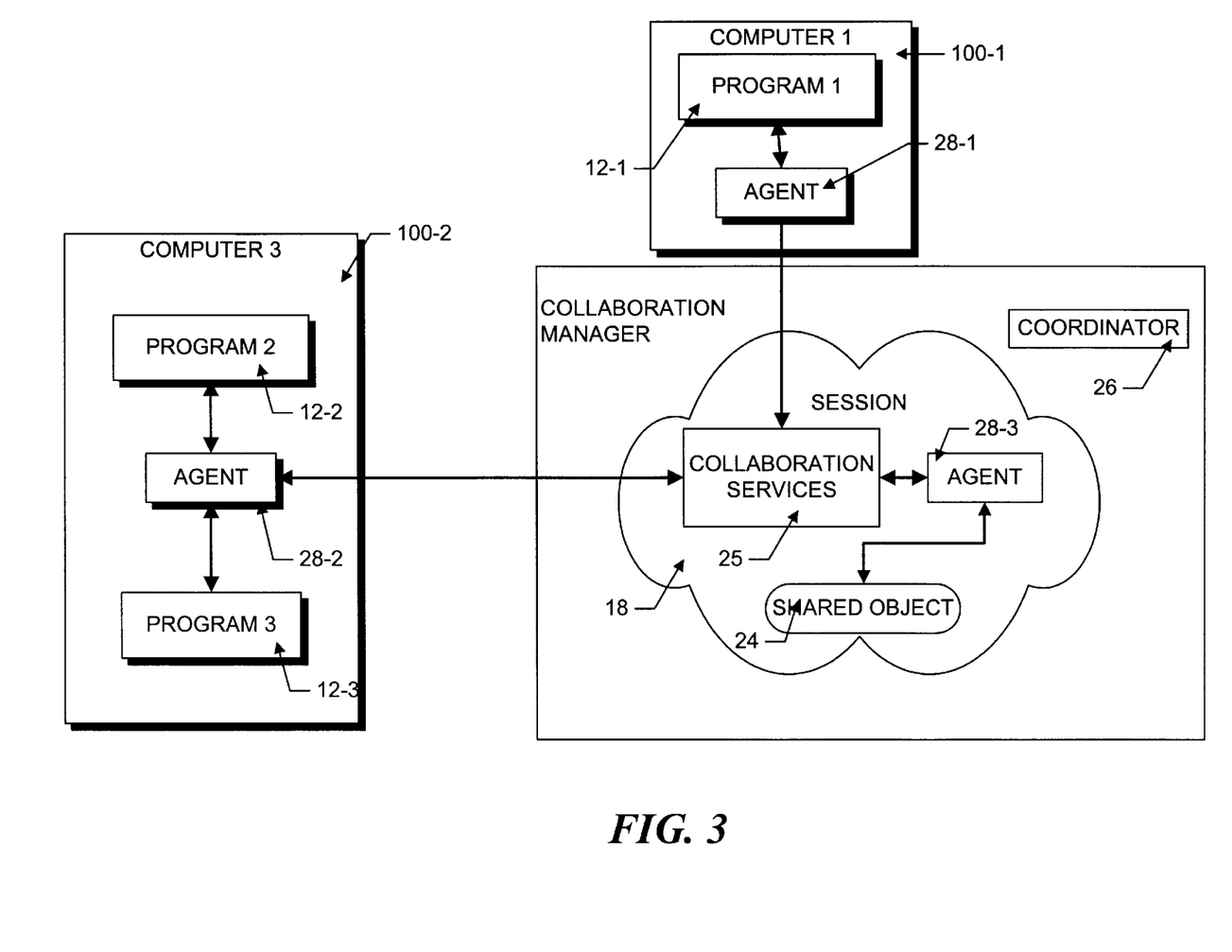
FIG. 3 is a schematic illustration of the collaboration manager and its interaction with application programs.

FIG. 3 schematically shows the inventive collaboration manager 10, which preferably is implemented in the JAVA programming language which is described in detail in "Using JAVA 1.1", Third Edition, by Joseph Weber, copyright 1997 in Library of Congress Catalog No. 96-72213. The manager 10 includes at least one session object 18 which, in turn, includes a mechanism 25 for communicating between the session object 18 and each of the programs 12-1 to 12-3. The session object is instantiated from class information in the inventive collaboration framework.

In general terms, a session object 18 (discussed in detail below with reference to FIG. 9) represents a session in which a group of programs 12-1 to 12-3 (i.e., users) actively exchange information on the server 14. All information exchanged between the programs 12-1 to 12-3 is transferred through the session object 18, thus preventing direct transmission between the programs 12-1 to 12-3. In the preferred embodiment, a graphic representation of the session object 18 is displayed on a display device at each users' computer 100-1 to 100-2. Among other uses, the graphic display of the session object 18 enables each user to see which other users and programs 12-1 to 12-3 are utilizing the session object 18.

Programs 12-1 to 12-3 communicate with session object 18 by means of "messages." Each program sends information to the session object by "posting", or sending, a message to the session object. A program 12-1 begins a collaboration session by joining the session represented by the session object 18. Joining is performed by sending a join message to the session object 18.

In order to receive messages from the session object 18, a program joining a session registers one or more "interests" with the session object 18 when joining the session. The interests are registered by sending further messages from the program to the session object 18. An interest is a set of message types used to indicate messages which the joining program wants to receive. Thereafter, all messages posted to the session object 18 by any other programs and having the message type identified with the registered interest will be sent to the registering program. Details of interests and their inclusion in messages are discussed below.

The collaboration manager 10 may have one or more sessions running concurrently as indicated by the existence of one or more session objects. Programs 12 may collaborate in one or more of a plurality of concurrently running sessions. Each session object 18 thus includes registered interests from the member programs. A session represented by session object 18 may be designated as either "public" or "private." A session 18 is considered to be public when it can be accessed by any user of the collaboration manager 10. A public session 18 may be created by a user by manipulating a "session creation button" displayed by, for example, program 12-1 on a display (not shown) associated with computer 100-1. Selection of the session creation button causes program 12-1 to generate and send a message to the manager 10, which creates a session object 18 by conventional means. For example, a coordinator module 26 may be included in the manager 10 to create and manage public session objects. In addition to creating public sessions, the coordinator 26 may provide a number of other services for the session object 18. For example, it may maintain a list of users utilizing the session object 18. Each time a new program joins a session, the coordinator 26 may query the program to identify the user. Each of the users then may be listed on the display of each computer having a program utilizing the session object 18. The coordinator 26 also may maintain a record of all messages posted to the session object 18, and messages transmitted from the session object 18 to the programs.

A session is considered to be private when only selected users may access the associated session object 18. A private session is created by users and not the coordinator 26. For example, two users in a public session may choose to create a private session to discuss confidential information in a spread sheet application program. Both users may have copies of the spreadsheet application program on their respective computers 100 that will communicate in the private session. One of those users therefore may select a "create private session" button displayed on a user display to create the private session. Similar to the button that creates the public sessions 18, selection of the create private session button generates and sends a message to the manager 10, which creates a private session object 18 by conventional means.

Information is transferred between the programs 12-1 to 12-N and the session object 18 by a plurality of collaboration agents (for example, agents 28-1 and 28-2) which are located in each computer on which a collaborating program is located. Each computer, for example, computers 100-1 and 100-2 has a single collaboration agent object thereon regardless of the number of collaborating programs running on the computer.

FIG. 3 also shows a shared object 24 created on and maintained by the session server 14 as a part of the session object 18. The shared object 24 (which will be described in more detail below) is treated like a program in the session 18 and thus, interacts with the other programs 12-1 to 12-3 in the same manner as a program. Specifically, the shared object 24 posts messages to the session object 18, receives messages from the session object 18, and registers interests with the session object 18. This treatment of shared objects 24 enables functions to be executed on the session server 14 without requiring that they be executed by an application program such as program 12-1 on a remote computer 100-1. This consequently reduces congestion across the network. Moreover, each shared object 24 created for and used by the session 18 is derived from superclasses that are a part of the session class. Each of the programs 12-1 to 12-3 built from the inventive framework therefore is configured to include subclasses utilizing at least one of the superclasses in the framework.

Figure 4:
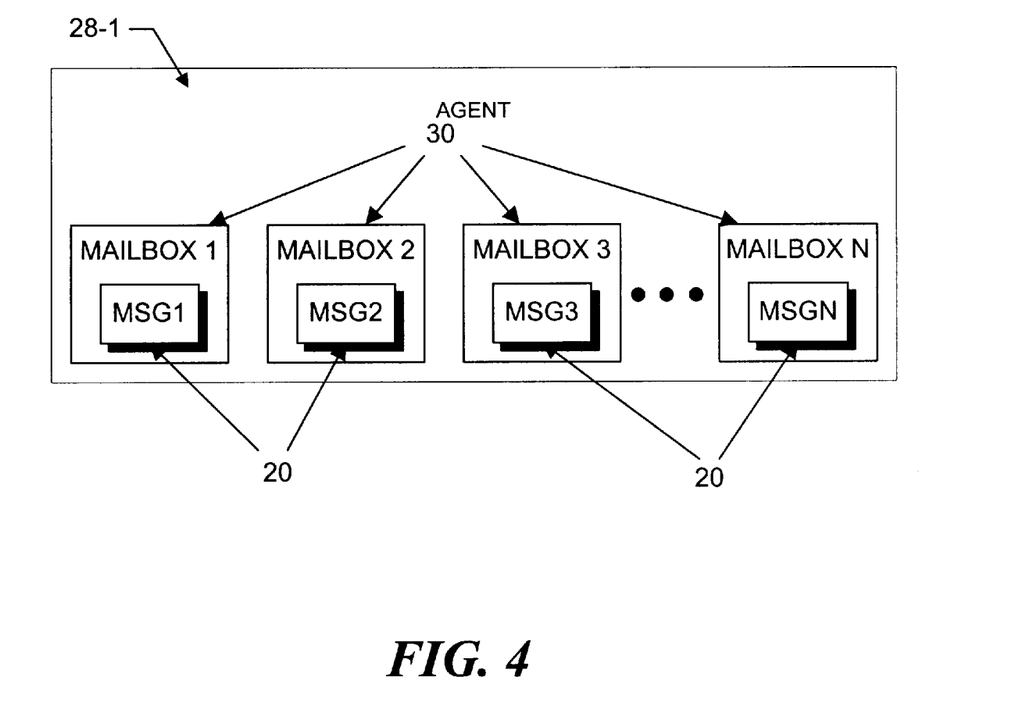
FIG. 4 is a schematic illustration of an agent.

FIG. 4 shows an agent 28-1, which includes a plurality of mailboxes 30. Each mailbox is a FIFO queue which stores message objects. A separate mailbox is associated with each collaborating program in the computer. For example a separate mailbox would be provided in agent 28-2 (FIG. 3) for each of programs 12-2 and 12-3. Message objects stored in the mailbox are transmitted, in order, from an agent to the session object by an object-streaming protocol. In accordance with the preferred embodiment, if the collaboration system is implemented in JAVA, then the JAVA-specified Remote Method Invocation (RMI) protocol may be used to provide object streaming by making remote object method calls. The RMI protocol has an advantage that it ensures reliable delivery and is secure on open network facilities such as the Internet. Incoming messages are sorted by type and delivered to the appropriate mailboxes.

Figure 5:
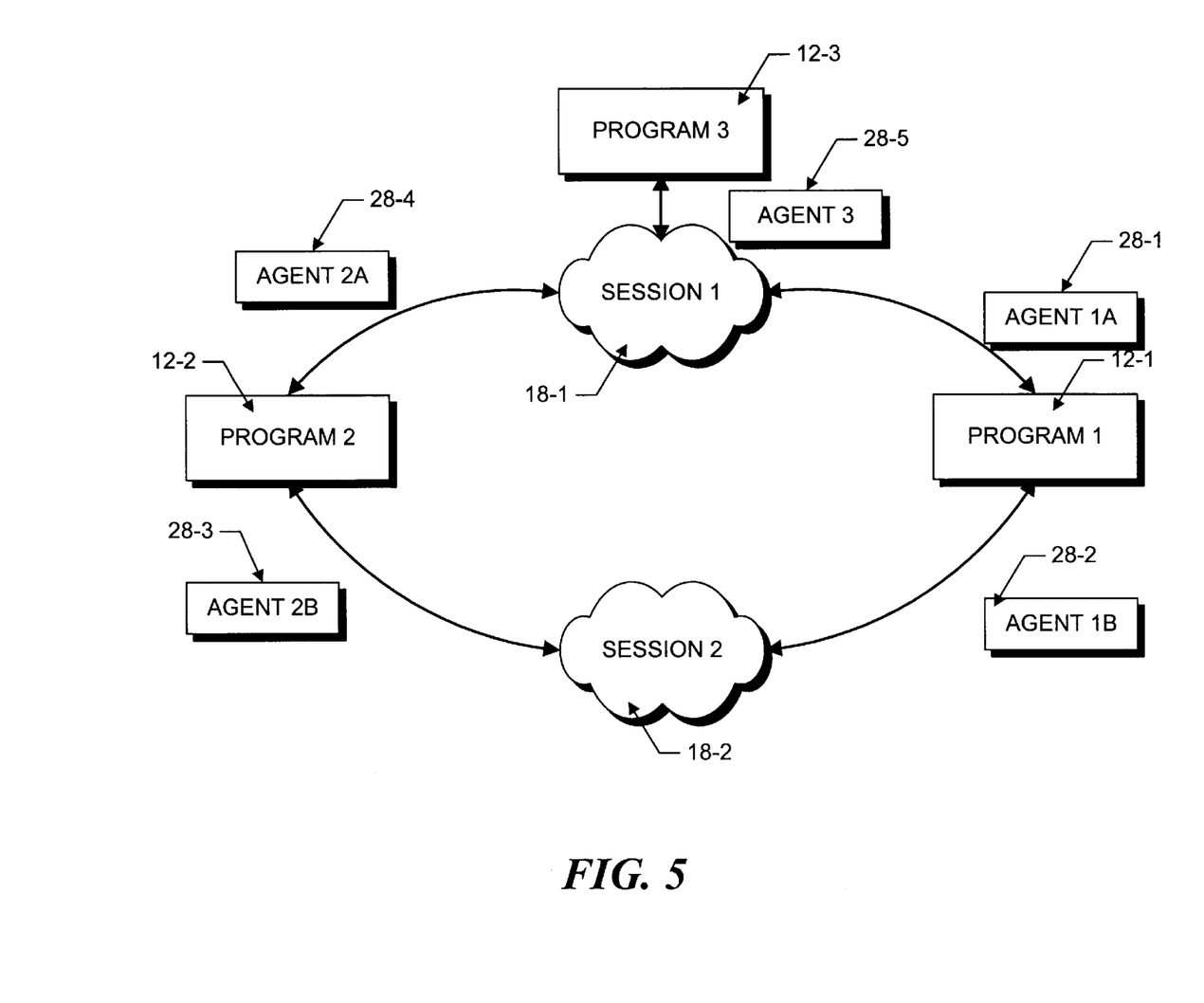
FIG. 5 is a schematic illustration of programs interacting with more than one session object.

In addition, each computer has a separate agent for each session in which the programs residing on it collaborate. FIG. 5, for example, shows a first program 12-1 and a second program 12-2 on separate computers that are both interacting with the same two sessions 18-1 and 18-2. Both programs 12-1 and 12-2 each include two agents 28-1 to 28-4 for interacting with both sessions 18-1 and 18-2. A third program 12-3 shown in FIG. 5, which collaborates with one session 18-1 only, has only one agent 28-5. The agent is responsible for locating a session and establishing a connection to it. The agent also registers and de-registers with the coordinator the set of message types which an application program is interested in receiving.

Figure 6:
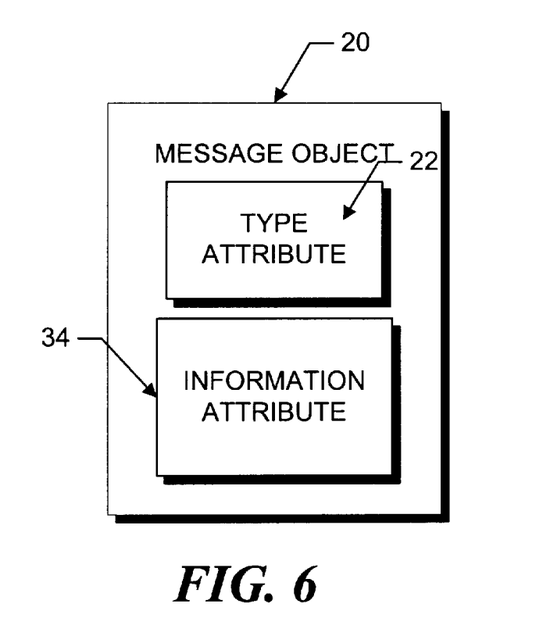
FIG. 6 is a schematic illustration of a message.

FIG. 6 shows an exemplary message object 20 which includes a type ID in the header 22 for identifying the message type and an information portion 34 containing information to be delivered to the destination program. All messages are typed and the basic message class is called CMessage and has no content (portion 34 is empty). Application programs can sub-class the basic message type, CMessage, and use instances of the subclasses in the collaboration system. However, the message type of a message may or may not be the same as the class name of the message type. For example, two instances of the same message class may have different message types. In the preferred embodiment, an arbitrary message can be sent to a collaborating program even if that program does not have the subclass information. In this case, the known class downloading properties of the JAVA virtual machine together with the transparent object-streaming facilities of RMI enable the collaborating program to receive a message even though it could not receive it otherwise.

As noted above, the invention preferably is implemented entirely in the JAVA programming language, which utilizes object-oriented program (OOP) techniques. Accordingly, the inventive application framework includes classes that serve as templates for the objects representing messages, agents, and sessions utilized by the collaboration system. Each application program built with the inventive framework thus incorporates classes subclassed from base framework classes and will inherit the behavior specified by those framework classes. As understood by those skilled in the art and mentioned above, OOP techniques involve the definition, creation, use and destruction of "objects." Objects are software entities comprising data elements (i.e., "attributes") and methods (i.e., "functions" or "rules") that manipulate the data elements. Attributes and related methods are treated by the software as an entity and can be created, used and deleted as if they were a single item. The attributes and methods together enable objects to model virtually any real-world entity in terms of its characteristics (represented by the data elements) and its behavior (represented by its data manipulation functions). In this way, objects can model both concrete things (e.g., people or computers) and abstract concepts (e.g., numbers or geometrical designs). Objects are defined by creating "classes", which are templates that instruct the compiler how to construct the actual object. By way of example, a class may specify the number and type of data variables, and the steps involved in the methods that manipulate such data variables. When an object-oriented program is compiled, the framework class code is incorporated into and compiled with the program. No objects exist at such time. Therefore, none of the variables or data structures in the compiled program exist or have any memory allotted to them. An object actually is created by the program at runtime by a specialized function called a "constructor" that uses the corresponding class definition and additional information, such as arguments provided during object creation, to construct the object. Conversely, objects are destroyed by a special function called a "destructor." Objects may be utilized by using their data and invoking their functions. When an object is created at runtime, memory is allotted and data structures are created, but the object has the data and functions defined by the class definitions.

Figure 7:
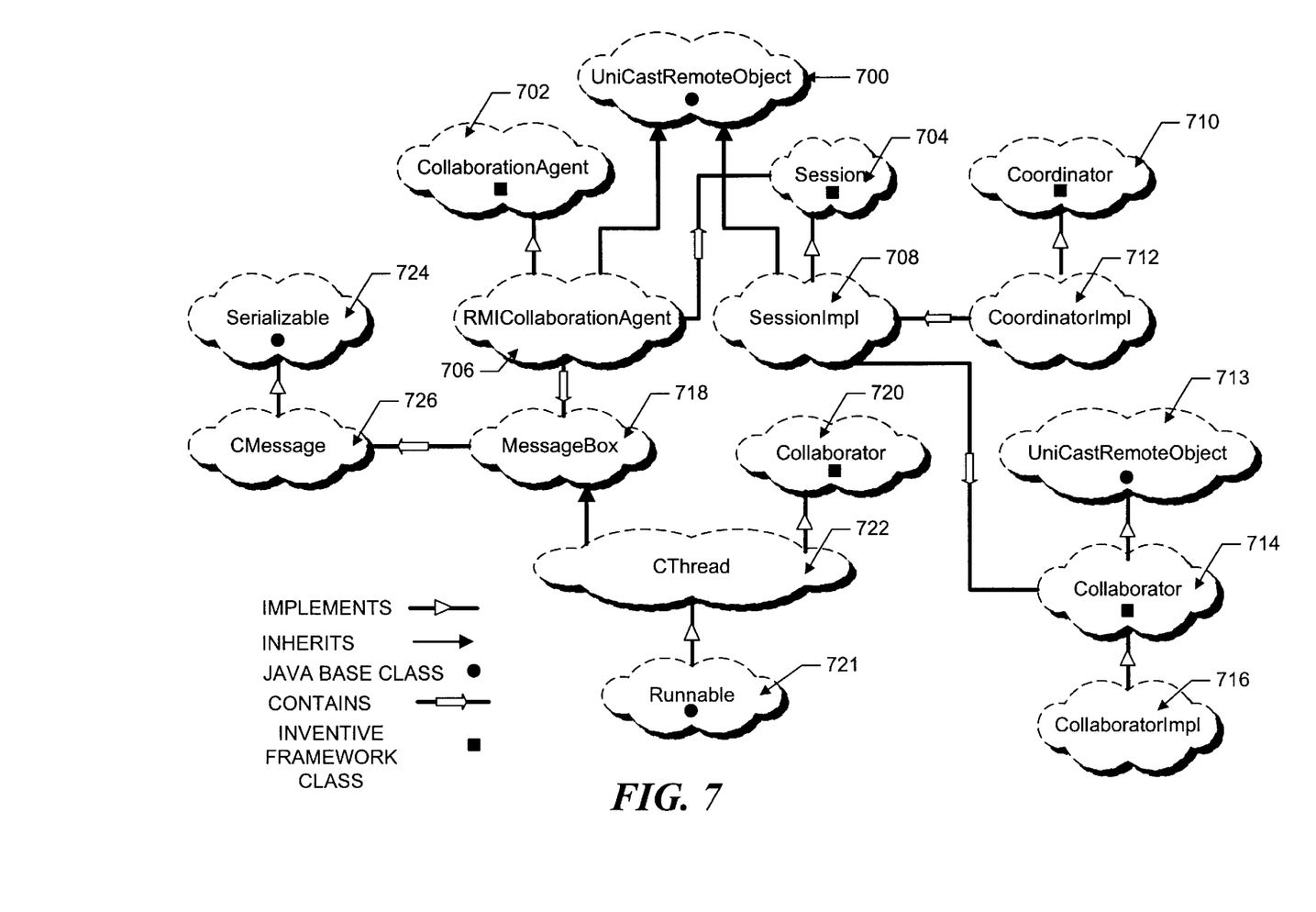
FIG. 7 is a class definition diagram of the base framework classes.

FIG. 7 illustrates a class definition diagram for the main classes used in the inventive collaboration framework. The class diagram specifically illustrates a framework implemented with the JAVA programming language, but care has been taken to isolate the main components from the underlying transport mechanism. The collaboration agents can be redesigned in a straightforward manner to operate with other well-known object streaming mechanisms such as CORBA or DCE. See Appendix "A", which includes illustrative class definitions, in JAVA, for the major classes in the framework shown in FIG. 7.

As shown in FIG. 7, the main classes RMICollaborationAgent 706 and SessionImpl 708 descend from a general JAVA class called UniCastRemoteObject 700. The UniCastRemoteObject class contains the essentials which allow the use of the RMI object streaming protocol. The RMICollaborationAgent class is, in turn, used to implement the CollaborationAgent class which is part of the collaboration framework main classes that are subclassable by the application program developer and can be used to build an application program.

The RMICollaborationAgent class 706 contains a MessageBox class 718 which contains the message queue and associated post and receive routines which are used by the agent to send and receive messages. The MessageBox class 718 also contains the CMessage class 726 which is the base class for messages. The RMICollaborationAgent class 706 also contains a Session class 704 which is part of the collaboration framework. As previously mentioned, each agent is uniquely associated with a session object, thus the RMICollaboration class 706 contains the Session class 704.

The SessionImpl class 708 is also contained in the CoordinatorImpl class 712 which is used to implement the Coordinator framework class 710. As previously mentioned the coordinator object can create a public session and thus must contain the session implementation.

The SessionImpl class 708, in turn, contains the Collaborator class 714 which is implemented by the CollaboratorImpl class 716 and also descends from the JAVA UniCastRemoteObject class 713. This relationship is necessary because the session object must deal with collaboration messages transmitted between the itself and the application programs.

The CMessage class 726 descends from the Serializable class 724 which is part of the JAVA language. This relationship is required to enable transmission of messages over the network.

In the preferred embodiment, there are two levels of interfaces-low and high level. The low level interface involves the classes CollaborationAgent 702, Session 704, Coordinator 710 and Collaborator 714. In order to build an application program, a developer must use these classes to perform the following steps:

(1) Create an Agent;

(2) Create MessageBoxes and specify the type of messages each MessageBox should receive;

(3) Associate the MessageBoxes with an Agent;

(4) Join a Session by locating the Coordinator; and (5) Process messages received in the MessageBoxes.

This level of programming gives a lot of flexibility to developers. For example, the developer can assign the MessageBoxes to different Agents, process messages in separate threads, etc . . . Essentially, the application decides how it wants to manage the collaboration runtime.

For developers who want a basic simple interface, the high level interface performs most of the above steps. This interface exposes a single class called CThread 722 which is implemented by the JAVA Runnable class 721. The CThread class implements the Collaborator class 720. When using this latter class, the developer must still specify the message types the application program is to receive, and implement a standard interface handleMessage(CollaborationMessage msg) to handle incoming messages. However, an application can create a CThread by passing three arguments: the name of the Coordinator (for joining a public session), the name of the Session and name of the Collaborator. The application need not explicitly deal with the MessageBox or the Agent because the CThread 722 does the following automatically:

(1) Creates an Agent;

(2) Locates the Coordinator and joins the specified Session; and (3) Creates a MessageBox and associates it with the Agent.

Figure 8:
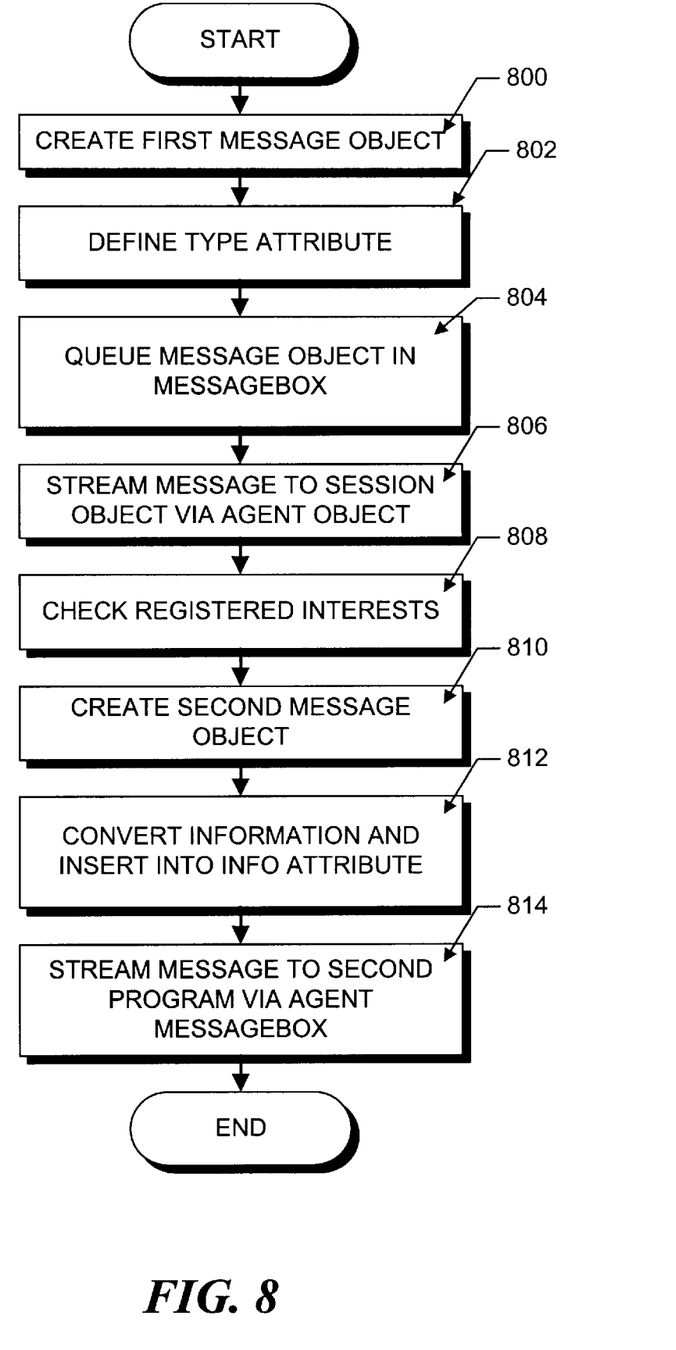
FIG. 8 is a flow chart detailing an exemplary process used by the collaboration manager for directing a message from a first program to a second program.

FIG. 8 shows an exemplary process used to transfer a message 20 from a first program 12-1 to a second program 12-2 as shown in FIG. 3. The process begins at step 800 where a first message object 20 is created in response to an output by the first program 12-1. In step 802, the message type is determined and inserted in the type attribute 22 of the message 20 (FIG. 6) and the program output is added to the information attribute 34 of the message 20. The message object 20 is then queued to the MessageBox in the agent 28-1 associated with the program 12-1. At step 806, the agent 28-1 posts the message 20 to the Coordinator 26 for the Session 18 by streaming the message to the Session 18.

At step 808, the registered interest for each program in the session 18 is checked to determine programs which want to receive messages of the message 20 type. Assuming program 12-2 has requested to receive messages of the type of message 20, the information in the information portion 34 is converted into an information format that may be utilized by the second program in step 810. The details of the conversion are discussed below with reference to FIG. 9. At step 812, a second message object is created for sending the converted information to the second program 12-2 and the converted information is inserted into the information portion 34.

In step 814, the second message is streamed from the session object 18 to the MessageBox for program 12-2 in Agent 28-2, thus completing the data transfer. The information in this message may be utilized as input for the second program 12-2. The routine illustrated in FIG. 8 is for the transmission of a message between an application program and all other interested application programs (a broadcast). It is also possible for an application program to transmit a message directly to another application program by a similar process (peer-to-peer transmission.)

Figure 9:
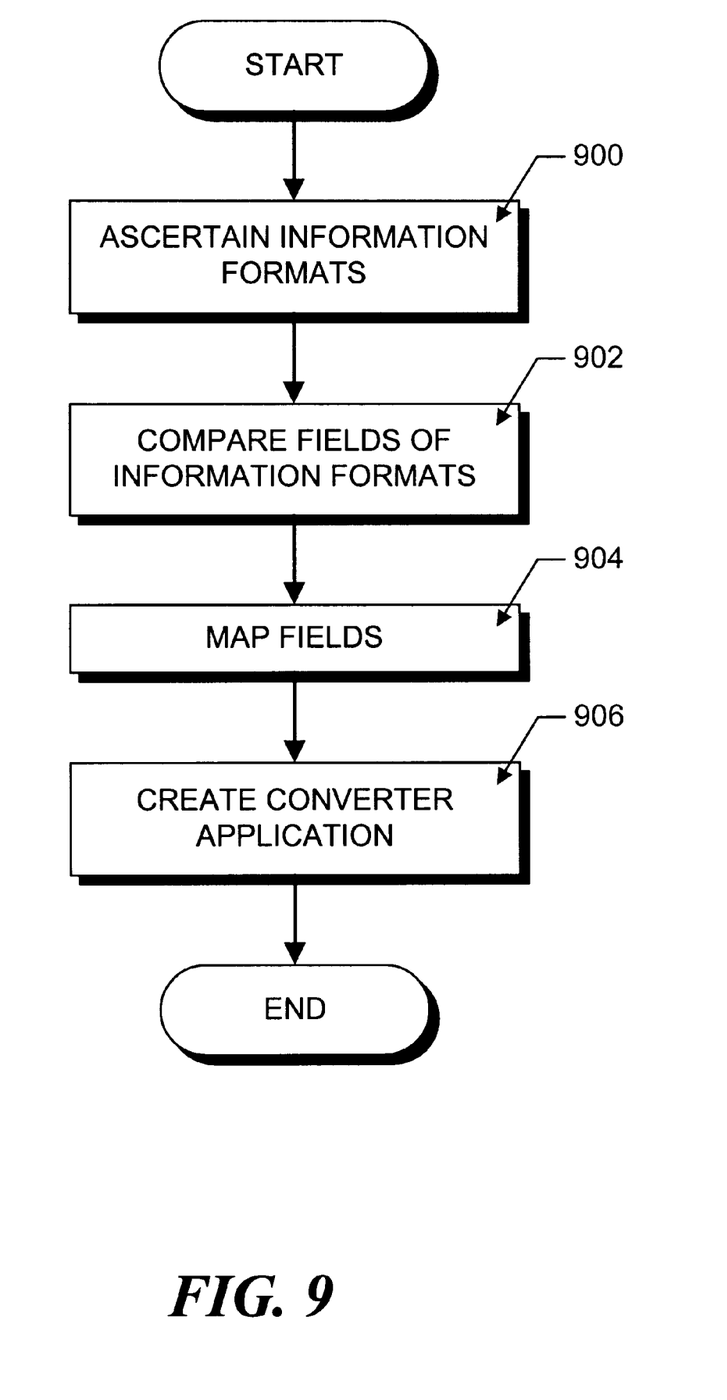
FIG. 9 is a flow chart detailing a process that may be used for creating a converter in the session object.

As noted above, the information in the information portion 34 of a message 20 often is in an information format that may not be compatible with many of the other programs utilizing the collaboration manager 10. Programs having such disparate information formats are referred to as "disparate programs." Accordingly, a converter must convert the information in the message information portion 34 into a format that is compatible with the programs used in the collaboration system 10. FIG. 9 shows a process that may be used by a program developer for creating a converter for a new program added to the system (i.e., a program that has never used the system). Such process must be repeated each time a new program is added to the collaboration system 10. Once the converter is created, the new program can freely communicate with the other programs in the system during any subsequent session. For simplicity, the converter creation process is shown with reference to a system having a first program 12-1 and a second new program 12-2 only. Those skilled in the art can easily modify the process to be performed in the system when more than two programs are active.

Specifically, at step 900, the information format of the new application 12-2 and the information format of the first program 12-1 are ascertained. This may be done by using a conventional graphical user interface (GUI) on a user display to display fields and attributes of each format. At step 902, the displayed fields of the two information formats are compared by the user. The user then utilizes the GUI to relate or map the fields of the two information formats so that the information from each of the programs 12 may be mapped to the information format of the other program 12 (step 904). Alternatively, when the collaboration manager is implemented in JAVA according to the preferred embodiment, the fields may be compared by utilizing commands in the well-known JAVA Application Program Interface. At step 906, a simple JAVA conversion application program is created by the user to automatically map the fields as designated in step 904. The newly created converter application program therefore executes in a session each time information is transferred between the two programs 12-1 and 12-2. Accordingly, each time new programs are added to the system, the above converter creation process is repeated, thereby enabling such new programs to freely exchange information.

Figure 10:
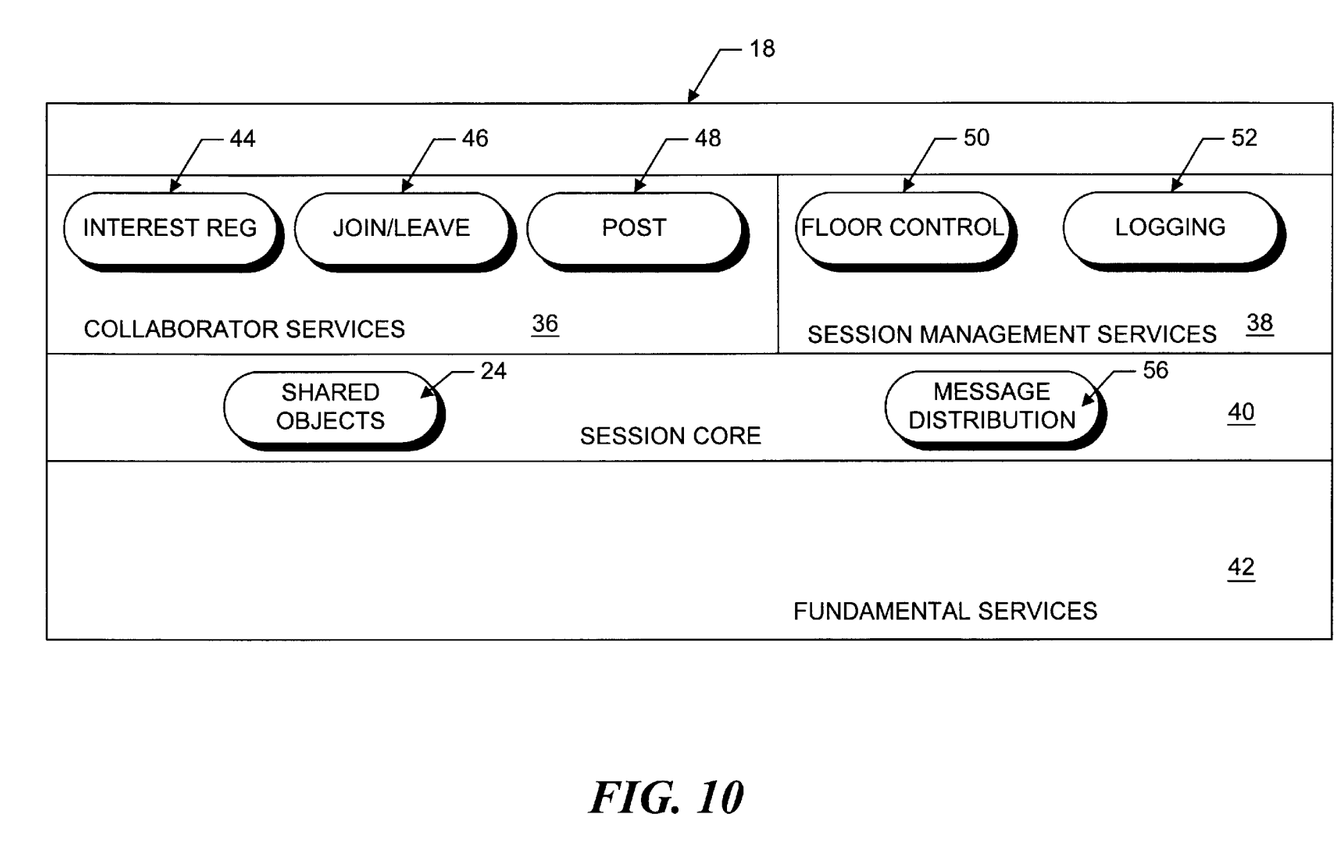
FIG. 10 is a schematic illustration of a session object.

FIG. 10 schematically shows the details of a session object 18 (FIG. 3). In summary, the session object 18 includes a plurality of component groups that each perform a specified session function. Those component groups include a collaborator services group 36 containing functions for interfacing between the application programs and the session object 18; a session management services group 38 containing functions for managing the use of the session object 18; a session core 40 containing functions for distributing messages 20 and sharing objects; and a fundamental session services group 42 containing functions for providing security, persistence, and related functions.

The collaborator services 36 group includes an interest registration module 44 for registering all programs utilizing the session 18. As noted above, application programs use their associated agent to register interests in sets of message types with the registration module as they join a session in order to specify the type of messages that they are interested in receiving. The interest registration module 44 also responds to messages from an agent de-registering a program when such program quits a session. Once de-registered, no further messages 20 will be transmitted to the agent for that program. A program must re-register with a session if it is to be used in that session.

Collaborator services 36 also includes a join/quit module 46 for enabling programs to join and quit a session. Upon joining a session, the join/quit module 46 registers a unique identifier for identifying the program. This prevents a program from joining a session while it already is utilizing the session. A program can leave a session by posting a "quit" message to the session via the appropriate program agent. Upon receipt of the quit message from the agent, the session responsively frees all session resources utilized by the program, and de-registers the program interest.

A post module 48 also is included in the collaborator services 36 for queuing messages received from the programs, and for queuing the messages to be directed to the other programs participating in the session. The session processes messages in the order received and, accordingly, message queues may be first-in first-out buffers in the memory of the server 14.

The session management services 38 include a floor control module 50 for determining which program participating in the session shall have the right to post a message to the session at a given time. For example, a session may display a word processing document to two application programs in the session. The programs may be specially configured, however, to allow only one user to edit the document at any given time. Simultaneous editing in such a case would cause the session and programs to crash or may result in erroneous data. To avoid this, the floor control module 50 controls the session to enable only one user to edit the displayed document. A requesting user may request the floor by posting a "REQUEST_FLOOR_EVENT" message to a session. If the floor is not already taken by another user, the session will grant the request. If the floor is taken by another user, the request is forwarded to that user. That user may relinquish the floor by posting a "RELINQUISH_FLOOR_EVENT" message to the session. The session management services 38 also includes a message logging module 52 for maintaining a history log of the session. Each of the messages posted to the session may be archived in a database for use at a later time. This is most useful for debugging purposes. The user GUI also may include controls for the logging module 52. In particular, there may be graphical controls to start or stop logging, pause or resume logging, and to specify the types of messages to be logged according to interest. It is preferable to use the message logging module 52 for only certain selected messages to limit the volume of stored messages.

The session core 40, distributes messages to programs which have indicated that they want to receive the messages and manipulates shared objects 24 (discussed below). The session core 40 includes both a message distribution portion 56 for receiving and distributing messages about the system, and the shared objects 24 that are manipulated by the programs 12.

Each of the application programs utilizing the collaboration system may exchange information by means of shared objects 24 in the session core 40. In the inventive collaboration system, shared objects 24 are the primary data structures that are manipulated by the collaborating programs. Shared objects 24 may be dynamically created in a session. For example, a database for storing information may be implemented as a shared object 24 in the session. Such shared object 24 may have object methods such as "ADD_ROW" and "DELETE_ROW." Accordingly, assuming that the database initially has ten rows, a first application program may send a message to the one of shared objects 24 querying the database for its total number of rows. If the first program requires eleven rows, it will utilize the "ADD_ROW" method. This causes the selected shared object to add a row to the existing database. A second program, which requires fewer than eleven rows, subsequently may query the database for its total number of rows. The second program responsively then may send a message utilizing the "DELETE_ROW" method. This causes the eleventh row to be deleted. Both programs therefore were able to manipulate and access the database in its current state. Furthermore, new programs that are added to the session immediately have knowledge of the current state of the database and thus, are not required to access archived information relating to the database.

The fundamental session services 42 component of the session 18 provides security, persistence, and related functions. Conventional session services for these functions may be utilized, such as RMI or CORBA.

Below is a portion of an exemplary class that creates a shared object 24 for tracking shares of corporations in the stock market. This shared object 24 is created and maintained on the session server 14 and receives messages relating to the stocks. Programs having a registered interest that is identical to that in the messages sent by the shared object 24 can ascertain the state of the stocks (e.g., price per share) at any selected time. The shared object 24 also supports a GUI "views" that enable a user to interact directly with the shared object.

```
Public class StockExchangeSharedObject extends
Collaboration.SharedObject
{
    // the following member functions must be defined for this class
    // to derive from base class 'SharedObject'.
    public StockExchangeSharedObject()
    {
        // Instantiate the shared object.
    public void initSharedObject()
    {
        // Do initialization specific to the shared object, such as setting up
        // data.
        // This will be called by the session.
    }
    public void launchSharedObject()
    {
        // Register the shared object with the session so that it becomes
        // visible to other programs in the session.
        // In this case, all the message types that the shared object can
        // receive are registered (e.g., "get_quote_message").
        // Any other task, such as launching a connection to a database, is
        // completed at this point.
    }
    public void closeSharedObject()
    {
        // Remove the shared object from the session.
    }
    public Collaboration.CViewCreator getViewCreator
    (String oname, String viewName)
    {
        // Shared objects are similar to programs in that they send and get
        // messages to and from the session. They differ from programs in
        // that they are created and maintained in the session server and
        // they may have views through which users can directly interact
        // with the shared object. Given the name of the view, this member
        // function gets the view of a shared object. A program gets the
        // actual view using a view creator. An example of a view creator
        // would be "TicklerTapeViewCreator."
    }
    public String[ ] getViewNames()
    {
        //Get the names of all the views supported by the shared object.
    }
}
    Below is a portion of an exemplary class for creating a message for
use with the above stock tracking class
StockExchangeSharedObject. Other
programs, such as a StockClient application program,
register an interest for the message type of
StockQuoteMessage in order to interact with the
program. The StockExchangeSharedObject can be
written so that it sends a
StockQuoteMessage whenever the stock quote changes.
public class StockQuoteMessage extends Collaboration.CMessage
{
    public StockQuoteMessage()
    {
        // A message is identified by its message type.
        // A Cmessage object stores the message type. The framework
        // does not care about the contents of the rest of this message
        //class. interest registrations of other programs are based on
        //the message interest type (StockQuoteMessageType) and not
        //on the class name (StockQuoteMessage).
        super ("StockQuoteMessageType");
    }
}
```

In an alternative embodiment, the invention may be implemented as a computer program product for use with a computer system. Such implementation may include a series of computer instructions fixed either on a tangible medium, such as a computer readable media (e.g., diskette 142, CD-ROM 147, ROM 115, or fixed disk 152 as shown in FIG. 1) or transmittable to a computer system, via a modem or other interface device, such as communications adapter 190 connected to the network 195 over a medium 191. Medium 191 may be either a tangible medium (e.g., optical or analog communications lines) or a medium implemented with wireless techniques (e.g., microwave, infrared or other transmission techniques). The series of computer instructions embodies all or part of the functionality previously described herein with respect to the invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network 195 (e.g., the Internet or World Wide Web).

Each of the graphical user interfaces discussed above may be constructed by conventional software programming techniques known in the art. It is preferred that the GUIs be constructed by visual builders, such as OCX™ (available from Microsoft Corp.) or Delphi™ (available from Borland Corp.).

Although various exemplary embodiments of the invention have been disclosed, it will be apparent to those skill in the art that various changes and modifications can be made which will achieve some of the advantages of the invention without departing from the true scope of the invention. These and other obvious modifications are intended to be covered by the appended claims.

APPENDIX "A"

```
package Collaboration;
public class CMessage implements Serializable
{
    pubiic CMessage() {}
       public CMessage( String type ) {}
       public CMessage( String type, boolean reflect ) {}
       public final boolean reflect() {}
       public final void setReflect( boolean value ) {}
       public final String messageType() {}
       public final boolean sameType( CMessage other ) {}
       public boolean equais( Object obj ){}
    public CollaboratorData getData() {}
    void setCollaboratorData( CollaboratorData data ) {}
}
public interface Collaborator extends java.rmi.Remote
{
    public void post( CMessage e ) throws RemoteException;
    public void ping() throws RemoteException;
}
public interface Collaborable
{
    void handleMessage( CMessage message );
}
interface CollaborationAgent
{
    boolean joinSession( String sessionName )
    throws NoSessionException, InSessionException;
    void quitSession();
    CollaboratorData[ ]roster();
    void flush() throws SendMessagesException;
boolean postDirect( MessageBox eb, CollaboratorData data, CMessage e )
throws SendMessagesException;
    // post - post given message e to Coordinator for distribution
    //
    void post( MessageBox eb, CMessage e )
    throws SendMessagesException;
    // postImmediate - send message immediately to the coordinator
```

APPENDIX "A"-continued

```
    void postImmediate( MessageBox eb, CMessage e )
    throws SendMessagesException;
    // registerMessageBox - register an message box
    //
// postFromSession - called by Collaborator object to post an Message sent
// by the Session
//
void postFromSession( CMessage e );
    void registerMessageBox( MessageBox eb );
    // deRegisterMessageBox - de-register an message box
    //
    void deRegisterMessageBox( MessageBox eb );
    // registerInterests - called by MessageBox to registerInterests
    //
    boolean registerInterests( MessageBox eb, Vector messageTypes );
    // registerInterests - called by MessageBox to deRegisterInterests
    //
    boolean deRegisterInterests( MessageBox eb,
    Vector messageTypes );
}
public class CollaborationException extends Throwable
{
    CollaborationException ()
    {
    }
}
public class CollaboratorData implements Serializable
{
    private String fName;
    private boolean fSessionObject;
    public CollaboratorData( String name ) {}
    CollaboratorData( String name, boolean sessionObject ) {}
    public boolean isSessionObject() {}
    public String name() {}
    public boolean equals( Object o ) {}
    public int hashCode() {}
}
public interface Coordinator extends Remote
{
    public boolean startSession( String sessionName )
    throws RemoteException;
    public void stopSession( String sessionName )
    throws RemoteException;
    public Session join( String sessionName, CollaboratorData data,
        Collaborator member) throws
RemoteException;
}
public class CThread extends MessageBox
implements Collaborable, Runnable
{
    public CThread( RMICollaborationAgent ag )
    throws RegistrationException
    {
    }
public CThread( Collaborable collaborable, RMICollaborationAgent ag )
throws RegistrationException
{
}
public RMICollaborationAgent getAgent() {}
public void start()
{
}
    public void run ()
    {
    }
    synchronized public void quit()
    {
    }
    public void handleMessage( CMessage e ) {}
}
public class MessageBox
{
    public MessageBox(CollaborationAgent agent)
    throws RegistrationException
    {
    }
    public void register(CollaborationAgent agent)
    throws RegistrationException
    {
```

APPENDIX "A"-continued

```
}
public void deRegister() throws RegistrationException
{
}
// get - called by MessageBox owners to remove and return next
// message in fMessageQ
//
public CMessage get( boolean block )
{
}
// peek: return a copy of the first element
public CMessage peek()
{
}
// flush: remove all elements;
public void flush()
{
}
// howMany: returns the number of messages in storage;
public int numberOfMessagesPending()
{
}
// registerInterest - called by messageBox owners to registerInterest
// with CoordinationAgent
public void addInterest(Vector messageTypes)
{
}
// removeInterest - called by messageBox owners
to deRegisterInterest with
// CoordinationAgent
public void removeInterest( Vector messageTypes )
{
}
// post - post an message to the CoordinationAgent
//
public void post( CMessage e ) throws SendMessagesException
{
}
// postImmediate - post an message to the CoordinationAgent
without buffering
//
public void postImmediate( CMessage e )
throws SendMessagesException
{
}
}
public class RMICollaborationAgent implements CollaborationAgent
{
    public RMICollaborationAgent( String coordinatorName,
    CollaboratorData data) throws
RemoteException, IOException
    {
    }
    public RMICollaborationAgent( String coordinatorName,
    CollaboratorData data,
    String sessionName)
throws NoSessionException, InSessionException,
RemoteException, IOException
    {
    }
    // join - returns false if already joined
    synchronized public boolean joinSession( String sessionName )
    throws NoSessionException,
InSessionException
    {
    }
    // quitSession - returns false if not joined. Removes the
    MessageBox from MessageMappers
    // using the MessageBox's fMessageMappers
    //
    synchronized public void quitSession()
    {
    }
    synchronized public void keepObject( Shareable s, String name )
    throws RemoteException
    {
    }
    synchronized public CViewCreator getView( String name,
    String viewname )
```

APPENDIX "A"-continued

```
    throws RemoteException
    {
    }
    synchronized public String[] getViewNames( String objectName )
    throws RemoteException
    {
    }
    synchronized public String[] getObjectNames()
    throws RemoteException
    {
    }
    // roster - returns the datum of all collaborators in the session
    //
    synchronized public CollaboratorData[] roster()
    {
    }
    synchronized public void registerMessageBox(MessageBox eb)
    {
    }
    synchronized public void
    deRegisterMessageBox( MessageBox eb )
    {
    }
    // registerInterests - called by MessageBox to registerInterests
    //
    synchronized public boolean registerInterests(MessageBox eb,
    Vector messageTypes)
    {
    }
    // registerInterests - called by MessageBox to deRegisterInterests
    //
    synchronized public boolean deRegisterInterests(MessageBox eb,
    Vector messageTypes)
    {
    }
    // postDirect - post message directly to give collaborator
    //
    synchronized public boolean postDirect( MessageBox eb,
    CollaboratorData data,
    CMessage e ) throws
SendMessagesException
    {
    }
    // flush - send all messages in the queue to the coordinator
    synchronized public void flush() throws SendMessagesException
    {
    }
    // post - store the message in the message queue
    //
    synchronized public void post(MessageBox eb, CMessage e)
    throws SendMessagesException
    {
    }
    // outbound messages: postImmediate - post given message
    e to the queue and
    // flush the queue to the Coordinator for distribution
    //
    synchronized public void
    postImmediate( MessageBox eb, CMessage e )
    throws SendMessagesException
    {
    }
    public void postFromSession( CMessage e )
    {
    }
}
```

What is claimed is:

1. A method for use in a collaborative system having a memory for communicating information from a first program utilizing a first information format to a second program utilizing a second information format that is different from the first information format, the method comprising the steps of:

A. constructing a first session object in the memory, which session object is constructed in a central location and is not part of either the first program or the second program, communicates with both the first and second program with wrapper messages having the same message format and broadcasts received messages to all collaborators in the collaboration system;

B. inserting information in the first format generated by the first program into a first wrapper message and sending the first wrapper message from the first program to the session object;

C. converting the information from the first format to the second format in the session object; and D. inserting the converted information into a second wrapper message and sending the second wrapper message to the second program.

2. The method as defined by claim 1 wherein step B comprises:

B1. constructing a first agent for receiving information generated by the first program and inserting the received information into the first wrapper message.

3. The method as defined by claim 2 wherein step D comprises:

D1. constructing a second agent for removing information from the second wrapper message and providing the removed information to the second program.

4. The method as defined in claim 3 wherein the session object, the first agent and the second agent are constructed from classes which form a common framework.

5. Apparatus for use in a collaborative system having a memory for communicating information from a first program utilizing a first information format to a second program utilizing a second information format that is different from the first information format, the apparatus comprising:

a first session object in the memory, which is constructed in a central location and is not part of either the first program or the second program, communicates with both the first and second program with wrapper messages having the same message format and broadcasts received messages to all collaborators in the collaboration system;

a first wrapper mechanism which inserts information in the first format generated by the first program into a first wrapper message and sends the first wrapper message from the first program to the session object;

a converter in the session object which converts the information from the first format to the second format; and a second wrapper mechanism which inserts the converted information into a second wrapper message and sends the second wrapper message to the second program.

6. The apparatus as defined by claim 5 wherein the first wrapper mechanism comprises a first agent for receiving information generated by the first program and inserting the received information into the first wrapper message.

7. The apparatus as defined by claim 6 wherein the second wrapper mechanism comprises a second agent for removing information from the second wrapper message and providing the removed information to the second program.

8. The apparatus as defined in claim 7 wherein the session object, the first agent and the second agent are constructed from classes which form a common framework.

9. A computer program product for use in a collaborative system having a memory for communicating information from a first program utilizing a first information format to a second program utilizing a second information format that is different from the first information format, the computer program product comprising a computer usable medium having computer readable program code thereon, including:

program code for constructing a first session object in the memory in a central location, which session object is not part of either the first program or the second program, communicates with both the first and second program with wrapper messages having the same message format and broadcasts received messages to all collaborators in the collaboration system;

program code which inserts information in the first format generated by the first program into a first wrapper message and sends the first wrapper message from the first program to the session object;

program code in the session object which converts the information from the first format to the second format; and program code which inserts the converted information into a second wrapper message and sends the second wrapper message to the second program.

10. The computer program product as defined by claim 9 wherein the program code which inserts information into the first wrapper message comprises program code for constructing a first agent for receiving information generated by the first program and inserting the received information into the first wrapper message.

11. The computer program product as defined by claim 10 wherein the program code which inserts information into the second wrapper mechanism comprises program code for constructing a second agent for removing information from the second wrapper message and providing the removed information to the second program.

12. The computer program product as defined in claim 11 wherein the session object, the first agent and the second agent are constructed from classes which form a common framework.

13. A computer data signal embodied in a carrier wave for use in a collaborative system having a memory for communicating information from a first program utilizing a first information format to a second program utilizing a second information format that is different from the first information format, the computer data signal comprising:

program code for constructing a first session object in the memory in a central location, which session object is not part of either the first program or the second program, communicates with both the first and second program with wrapper messages having the same message format and broadcasts received messages to all collaborators in the collaboration system;

program code which inserts information in the first format generated by the first program into a first wrapper message and sends the first wrapper message from the first program to the session object;

program code in the session object which converts the information from the first format to the second format; and program code which inserts the converted information into a second wrapper message and sends the second wrapper message to the second program.

14. The computer data signal as defined by claim 13 wherein the program code which inserts information into the first wrapper message comprises program code for constructing a first agent for receiving information generated by the first program and inserting the received information into the first wrapper message.

15. The computer data signal as defined by claim 14 wherein the program code which inserts information into the second wrapper mechanism comprises program code for constructing a second agent for removing information from the second wrapper message and providing the removed information to the second program.

16. The computer data signal as defined in claim 15 wherein the session object, the first agent and the second agent are constructed from classes which form a common framework.

* * * * *